United States Patent
Haas et al.

(10) Patent No.: US 7,017,365 B2
(45) Date of Patent: Mar. 28, 2006

(54) SYSTEM FOR DEHUMIDIFICATION IN AIR CONDITIONERS

(75) Inventors: Joachim Haas, Wangen (DE); Alfred Sauterleute, Heimenkirch (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 62 days.

(21) Appl. No.: 10/342,619

(22) Filed: Jan. 15, 2003

(65) Prior Publication Data
US 2003/0177781 A1    Sep. 25, 2003

(30) Foreign Application Priority Data
Jan. 16, 2002    (DE)    ................ 102 01 427

(51) Int. Cl.
*F25D 9/00*    (2006.01)

(52) U.S. Cl. .................. 62/402; 62/87; 62/401

(58) Field of Classification Search ........... 62/402, 62/401, 87
See application file for complete search history.

(56) References Cited

U.S. PATENT DOCUMENTS

| | | | |
|---|---|---|---|
| 4,430,867 A * | 2/1984 | Warner | 62/402 |
| 4,963,174 A | 10/1990 | Payne | |
| 5,214,935 A * | 6/1993 | Brunskill | 62/402 |
| 5,461,882 A * | 10/1995 | Zywiak | 62/401 |
| 5,887,445 A * | 3/1999 | Murry et al. | 62/402 |
| 5,906,111 A | 5/1999 | Lui | |
| 6,128,909 A | 10/2000 | Jonqueres | |
| 6,295,822 B1 * | 10/2001 | Mueller | 62/172 |
| 6,434,968 B1 * | 8/2002 | Buchholz et al. | 62/401 |
| 6,484,525 B1 * | 11/2002 | Piao et al. | 62/271 |
| 6,505,474 B1 * | 1/2003 | Sauterleute et al. | 62/172 |
| 6,519,969 B1 * | 2/2003 | Sauterleute | 62/401 |
| 6,526,775 B1 * | 3/2003 | Asfia et al. | 62/402 |
| 6,705,092 B1 * | 3/2004 | Zhou et al. | 62/87 |
| 2001/0025507 A1 * | 10/2001 | Bucholz et al. | |

FOREIGN PATENT DOCUMENTS

| | | |
|---|---|---|
| DE | 19935918 | 2/2001 |
| EP | 1099628 | 5/2001 |
| EP | 1112930 | 7/2001 |

* cited by examiner

Primary Examiner—Cheryl Tyler
Assistant Examiner—Filip Zec
(74) Attorney, Agent, or Firm—Dilworth & Harrese LLP

(57) ABSTRACT

The present invention relates to a system for dehumidification in air conditioners comprising an expansion stage, a condenser and comprising a water separator disposed upstream of the expansion stage. A dehumidification system with reduced system construction volume, reduced weight and increased reliability and improved system efficiency at lower cost is formed in accordance with the invention in that the condenser is formed by a heat exchanger (RAM heat exchanger) cooled with ambient air or stagnation air or with another fluid, with the exception of process air, to which the compressed air to be dehumidified is fed on the compressed air side.

43 Claims, 8 Drawing Sheets

SYSTEM FOR DEHUMIDIFICATION IN AIR CONDITIONERS

BACKGROUND OF THE INVENTION

The present invention relates to a system for air dehumidification in air conditioners, comprising an expansion stage, a condenser and comprising a water separator upstream of the expansion stage.

Such systems are known in different embodiments. They serve to dehumidify the air supplied to the cabin of, for example, an aeroplane. The dehumidification of the process air is in particular necessary when the aeroplane is at low flight altitude or when the air conditioner is running in ground operation. In all known systems, cold turbine discharge air is used indirectly or directly for this high pressure or low pressure dehumidification process.

FIG. 1 shows such a dehumidification system in accordance with the prior art. It is a dehumidification process with indirect use of the turbine discharge air. With the dehumidification system shown here, pre-compressed compressed air flows through the primary heat exchanger PHX and is subsequently further compressed in the compressor C. This air now flows through the secondary heat exchanger SHX. Both heat exchangers PHX and SHX are arranged in the stagnation air channel and are cooled with ambient air or with stagnation air in in-flight-operation.

The air discharged from the secondary heat exchanger SHX subsequently flows through the reheater REH and is further cooled in the downstream condenser CON. Some of the humidity contained in the air is hereby condensed. Subsequently, the part of the moisture condensed out is separated in the water separator WE. After passing the water separator WE and the cold reheater REH side, the air is led into the turbine T, expanded therein and cooled thereby. The cooled air is led through the cold side of the condenser CON, whereby the air on the warm side of the condenser CON is cooled and some of the humidity is condensed out. Irrespective of this, further turbine stages can follow after this turbine T. In any case, however, cold turbine discharge air is used for condensation purposes.

Such a dehumidification system brings along the disadvantage that an additional component is required in the form of a condenser, whereby an increased system construction space requirements results due to limited flexibility in the component arrangement. A further disadvantage consists of additional pressure losses due to the condenser CON and a reduced thermodynamic system processor efficiency due to the heat transmission at the turbine discharge. A further disadvantage consists of the fact that, as a rule, a complex condenser design (e.g. bypass) is required to reduce or prevent the icing risk or blockade on the warm and cold side. Provision can, for example, be made for the cold condenser inlet side to be heatable to avoid ice accretion. Overall, an increased effort results for the protection against icing due to the condenser CON.

Furthermore, dehumidification systems are known which provide a direct utilisation of the turbine discharge air, with humidity being separated directly after the turbine. Such a system is shown sectionally in FIG. 2.

The water separator WE is disposed downstream of the turbine T. Here, the temperature of the turbine discharge air must be above 0° C. in order to prevent icing in the water separator WE. The condensation of the humidity takes place in the turbine due to the expansion and to the associated cooling, with further turbine stages also being able to follow the water separator WE. If no further turbine is disposed downstream of the water separator WE, then one speaks of low pressure water separation.

The direct utilisation of the turbine discharge air for dehumidification is associated with the following disadvantages. If only one turbine stage is provided, if it is therefore low pressure separation, the lower pressure level at the turbine discharge results in a higher volume flow for the water separation components, for which purpose correspondingly larger components must be provided. This is associated with an unwanted increase in weight and dimensions. A further disadvantage consists of the fact that low pressure water separators require servicing; high pressure water separators, in contrast, do not.

The turbine discharge temperature is limited to values larger than 0° C. to avoid icing. To produce the demanded cooling capacity, this limited temperature must be compensated by an increased rate of flow. This also results in an unwanted increase in weight and construction height.

Provision can further be made to provide a least two turbine stages (high pressure separation). To avoid the disadvantage of the limited discharge temperature with direct utilisation of the turbine discharge air for the water separation, at least two expansion devices have been required up to now, with the dehumidification taking place between the stages. This second stage, however, makes the system more complex and is associated with additional effort (two refrigerating machines or one refrigeration machine with two turbine stages), additional effort and reduced reliability.

SUMMARY OF THE INVENTION

It is therefore the object of the present invention to provide a system for the air dehumidification in an airborne air conditioner which has been optimised with respect to construction space and weight and in which at the same time the icing problem can be avoided.

In accordance with the invention, this object is solved by a system for air dehumidification having the features set forth herein. Accordingly, the condenser is formed by a heat exchanger (RAM heat exchanger) cooled with ambient air or stagnation air or another fluid, with the exception of process air, to which the compressed air to be dehumidified is supplied on the compressed air side. In accordance with the invention, it is thus not necessary to provide a separate condenser since the heat exchanger anyway present in the stagnation air channel is used for condensation purposes. On the compressed air side, the compressed air to be dehumidified is supplied to the RAM heat exchanger. The operating conditions are chosen such that condensation forming takes place in the RAM heat exchanger and that preferably almost 100% of this condensate is then separated. It can be achieved by optimized efficiencies of the RAM heat exchanger and of the water separator and by an increased pressure level that no further dehumidification is required.

In a further aspect of the present invention, a compressor stage is provided which is disposed upstream of the RAM heat exchanger on the compressed air side. The air to be dehumidified thus, after the condenser, passes the RAM heat exchanger in which, in accordance with the invention, the condensation takes place. In an advantageous aspect, the compressor stage is formed by a compressor and the expansion stage is formed by a turbine which, with a fan arranged in the stagnation air channel, form a three-wheeled machine.

In accordance with a preferred aspect of the present invention, the compressed air is provided by a compressor stage which is acted upon by pre-compressed air or with ambient air or stagnation air or with cabin air and compressed this air. The pre-compressed air can, for example, be bled air from the engine or from an auxiliary power unit of an aeroplane.

In a further aspect of the present invention, provision is made that a primary heat exchanger is disposed upstream of the RAM heat exchanger on the compressed air side.

The RAM heat exchanger and the primary heat exchanger can be arranged in the stagnation air channel such that the primary heat exchanger serial or parallel to the RAM heat exchanger is acted upon by cooling air containing ambient air or stagnation air.

In accordance with the invention, another cooling medium or fluid, with the exception of process air, can also be used.

In an advantageous aspect, the RAM heat exchanger and the primary heat exchanger are arranged in the stagnation air channel such that the primary heat exchanger partly serial and partly parallel to the RAM heat exchanger is acted upon by cooling air containing ambient air or stagnation air. It can be achieved in this manner that the compressed air supplied to the compressor stage is cooled to a temperature level which is under that which could be achieved with a completely serial switching of RAM heat exchanger and primary heat exchanger. The low temperature at the inlet side of the compressor stage results in a correspondingly lower temperature at the inlet of the RAM heat exchanger and thus in more favourable condensation conditions.

Provision can be made for the RAM heat exchanger in the discharge region on the compressed air side not to have any cooling fins on the stagnation air side. Since it is substantially the stagnation air temperature in the discharge region on the compressed air side of a heat exchanger which is decisive for the degree of heat transmission, it is important that this region of the primary heat exchanger is acted upon by air which is as cool as possible, which is achieved in that the RAM heat exchanger has no cooling fins on the stagnation air side in the discharge region on the compressed air side.

An increase in the efficiency of the RAM heat exchanger is achieved in that this is designed as a cross flow, a double cross flow, a cross counter flow and/or a double parallel cross flow unit. The double parallel cross flow unit is additionally acted upon by a secondary cooling medium.

The secondary cooling medium can, for example, be cabin air or another fluid. Accordingly, in a further aspect of the present invention means are provided by which the cabin air can be supplied to the RAM heat exchanger as cooling air.

In a preferred aspect, the mixing in of the cabin air takes place on the stagnation air side in the discharge region of the RAM heat exchanger on the compressed air side.

Furthermore, an expansion turbine can be provided for the expansion of cabin air, with means being provided by which the expanded air can be supplied to the RAM heat exchanger as cooling air.

In a preferred aspect of the present invention, the RAM heat exchanger is split into two parts, with the heat exchanger region facing the discharge side on the compressed air side being acted upon by the expanded cabin air.

Generally, the RAM heat exchanger can be split into two parts, with the heat exchanger region facing the discharge side on the compressed air side being acted upon by air or another fluid whose temperature lies under ambient air pressure or stagnation air temperature. This secondary cooling air or fluid can be cabin air. With the version with secondary cooling air, the possibility exists of situating a second heat exchanger downstream on the discharge side of the RAM heat exchanger on the compressed air side, with this second heat exchanger being able to be cooled for example with cabin air of 27° C. This second heat exchanger can also be integrated into the RAM heat exchanger. Alternatively, only the region of the compressed air discharge side of the RAM heat exchanger on the stagnation air side can also be additionally cooled with cabin air.

The cabin air is preferably only supplied to the RAM heat exchanger on the ground or at low flight altitudes. Due to the low stagnation air temperature and to the low ambient humidity in flight at higher flight altitudes, cabin air is no longer required as cooling air. So that the whole cross-section on the stagnation air side can; however, be used for the RAM heat exchanger in this flight phase, the supply of stagnation air and secondary cooling air, in particular cabin air, is preferably not fully separated in the RAM heat exchanger. This means that the part of the RAM heat exchanger acted upon by the secondary cooling air on the ground is acted upon by stagnation air in flight (with the supply of cabin air switched off).

A further improvement in the cooling capacity can be achieved in that means are provided by means of which water can be sprayed into the cooling air flow of the RAM heat exchanger, with the water being water accumulating in the water separator and/or additionally supplied water. The evaporating enthalpy of the water sprayed in is hereby utilised to reduce the temperature of the cooling air or of the ambient or stagnation air, which increases the cooling capacity accordingly.

The water is preferably sprayed in on the stagnation air side in the discharge region of the RAM heat exchanger on the compressed air side. It can furthermore be provided that the water is sprayed in both in the ambient air flow or in the stagnation air flow and in the air flow in accordance with any one of claims 9 to 13, thus into the secondary cooling air flow. The efficiency can be improved by an efficient water injection and/or by an increase in the stagnation air amount.

In a further aspect of the present invention, a reheater is provided which is disposed upstream of the expansion stage and which is acted upon by hot air to evaporate residual water in the air supplied to the expansion stage. This is in particular of advantage when a turbine disposed downstream of the dehumidification process expands the air to below 0° C. The reheater has warmer air flowed through it, whereby the water proportion remaining after the water separator evaporates and icing in the turbine is thus prevented, with the amount of warm reheater air being much lower than the compressed air amount. The supply with hot air can be carried out in different variants.

The reheater can, for example, be in communication on its hot air side on the inlet side with the compressed air inlet of the RAM heat exchanger and on the discharge side with the inlet of a compressor disposed upstream of the RAM heat exchanger on the compressed air side.

The reheater can be in communication on its hot air side on the inlet side with the inlet side of a restrictor disposed upstream of the compressed air inlet of the RAM heat exchanger and on the outlet side with the inlet of the RAM heat exchanger.

Provision can furthermore be made for the reheater to be in communication on its hot air side on the inlet side with the inlet of a heat exchanger which is disposed upstream of a compressor disposed upstream of the RAM heat exchanger and on the outlet side with the inlet of the compressor.

The reheater can be in communication on its hot air side on the inlet side with the inlet of a restrictor disposed upstream of a compressor and on the outlet side with the inlet of the compressor.

In a further aspect of the present invention, provision is made for the reheater to be in communication on its hot air side on the inlet side with the installation space of the air conditioner and on the outlet side with the discharge of the RAM heat exchanger on the stagnation air side or of another heat exchanger.

On the ground, in accordance with an embodiment, the cooling air or the ambient air or the stagnation air is transported through a fan FAN which is in communication with the compressor and the turbine by means of a common shaft.

In accordance with a further aspect of the present invention, a fan is provided in the stagnation air channel which is not in communication with the expansion stage and compressor stage and which is equipped with a drive of its own. It is achieved by the decoupling of the fan from the turbine that the compressor as the total turbine power made available to it, whereby a further increase of the compressor capacity results. The increased pressure level in the RAM heat exchanger thereby achieved results in an increased degree of condensation.

The fan can be driven by a separate motor and/or turbine. Provision can be made for the fan to be driven by a separate motor and/or turbine and to be in communication on the drive side by a shaft with an additional compressor disposed upstream of the RAM heat exchanger.

In a preferred aspect of the present invention, provision is made for the water separator to be integrated in the discharge of the RAM heat exchanger on the compressed air side such that both components form a unit.

Provision can also be made for the water separator to be disposed downstream of the RAM heat exchanger on the compressed air side to form a separate component.

In a further aspect-of the present invention, two or more expansion stages switched in parallel or serially are disposed downstream of the water separator. Provision can be made, for example, for a dehumidification unit to be used in common by two turbines.

In a further aspect of the present invention, a bypass can be provided which can be closed by a valve, which bypasses the water separator and is in communication with the inlet of the expansion unit. At higher flight altitudes, a dehumidification of the air is not required due to the low ambient humidity. For these conditions, the efficiency of the system process can be increased by the bypass. The bypass provided with the valve can also bypass the reheater in addition to the water separator. By opening the bypass valve, the water separator and the reheater are bypassed, whereby the pressure losses of these components are eliminated and the transmission and the capacity (cooling capacity) of the system are increased accordingly.

The bypass having a valve is preferably arranged such that it connects the discharge of the RAM heat exchanger on the compressed air side to the inlet of the expansion unit.

BRIEF DESCRIPTION OF THE DRAWINGS

Further advantages and details of the present invention will be explained in more detail with reference to an embodiment shown in the drawing, in which are shown.

DESCRIPTION OF THE PREFERRED EMBODIMENTS

Figure 1:
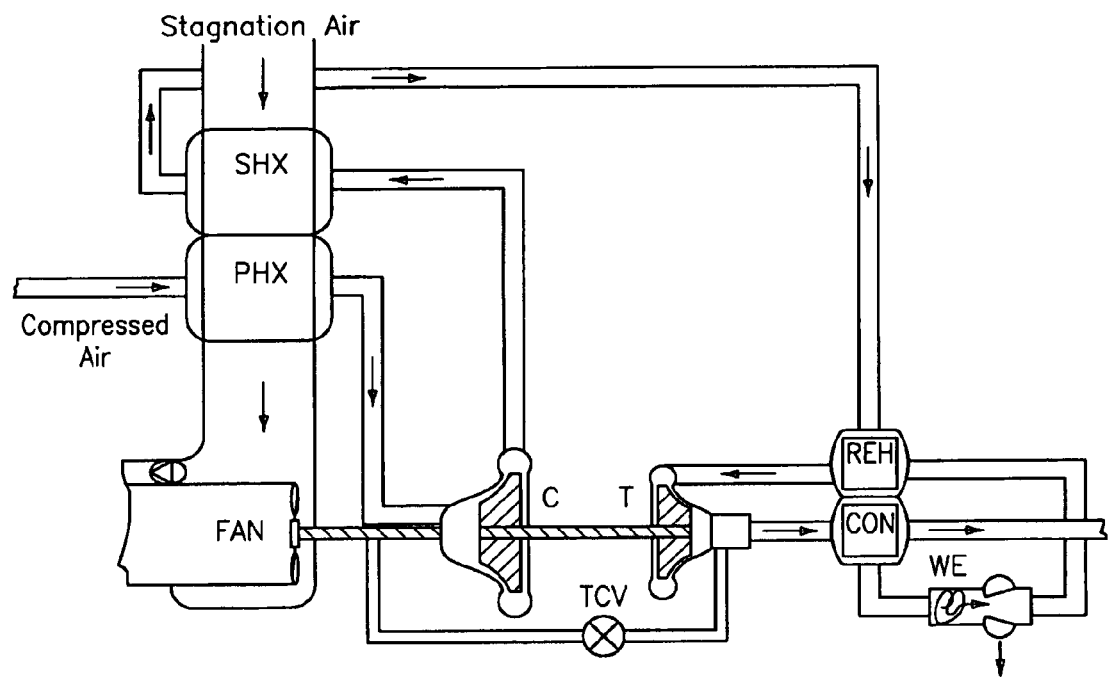
FIGS. 1, 2: humidification systems in accordance with the prior art.
Figure 2:
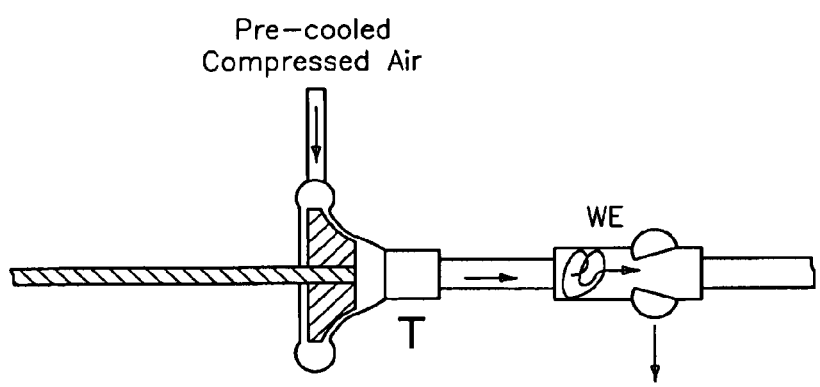
Figure 3:
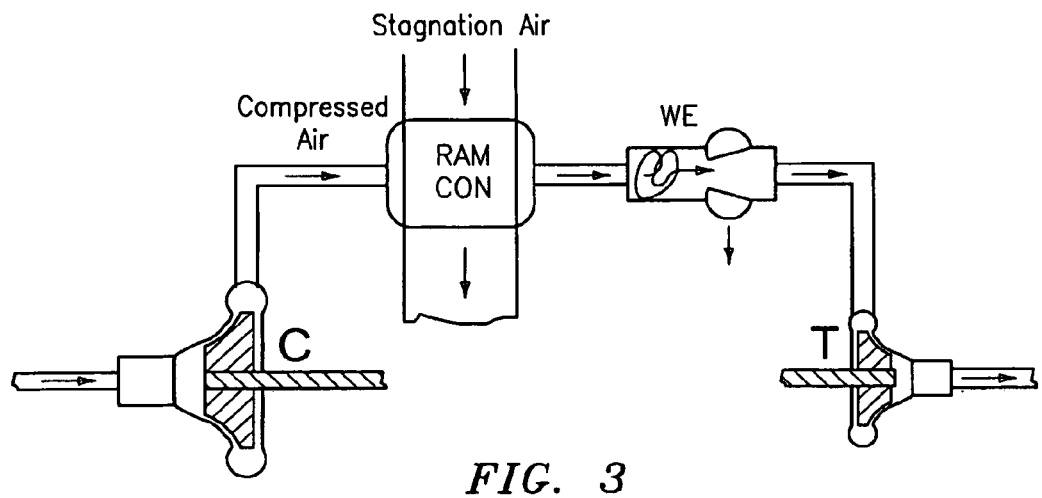
FIG. 3: a sectional representation of the dehumidification system with condensation in the RAM heat exchanger and subsequent water separation.

FIG. 3 shows in a section-wise representation the dehumidification of air by means of a dehumidification system in accordance with the invention comprising a compressor C, a turbine T as well as a RAM heat exchanger or condenser RAM CON (RAM heat exchanger) interposed therebetween and a water separator WE. The compressed air which is as a rule removed from the engines or auxiliary power units of an aeroplane is supplied to the compressor C and further compressed therein. The air is subsequently led through the RAM heat exchanger RAM COM and cooled hereby. Stagnation air or, in ground operation of the aeroplane, ambient air serves as the cooling air. The compressed air is cooled and humidity condensed thereby in the RAM heat exchanger RAM CON. The condensate is separated up to almost 100% in the downstream water separator WE. The air is subsequently led through the turbine, expanded and cooled here and supplied to the mixing chamber disposed upstream of the cabin. The compressor C disposed upstream of the RAM heat exchanger RAM CON on the compressed air side serves to generate the high pressure level in the RAM heat exchanger RAM CON required for the condensation.

Figure 4:
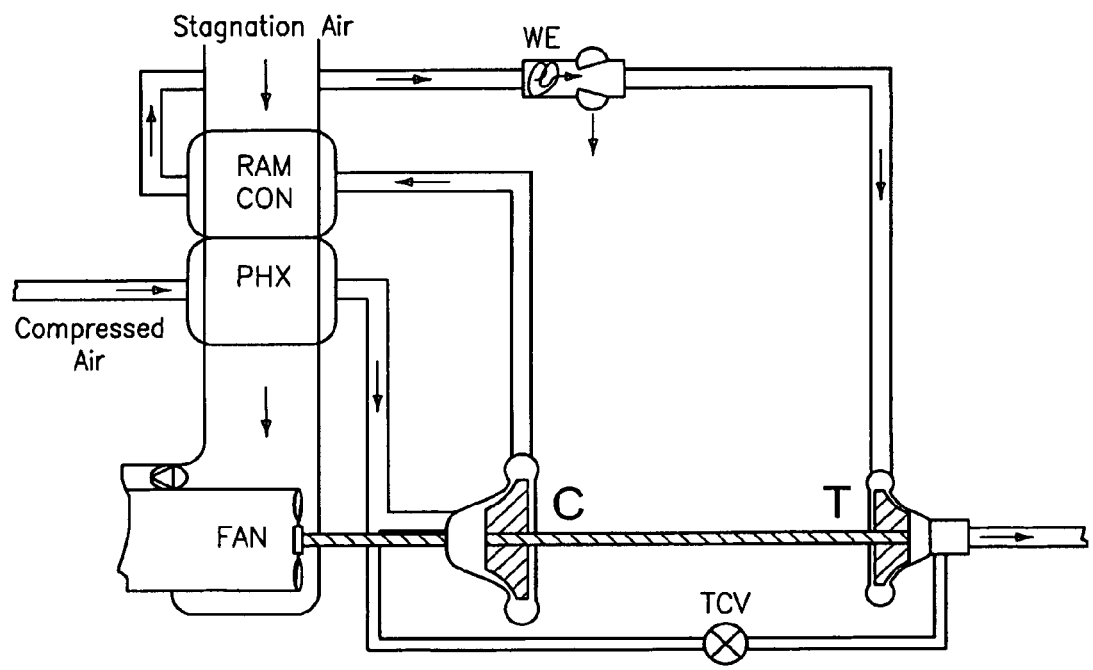
FIG. 4: a complete dehumidification system with a RAM heat exchanger as a condenser and 3-wheeled machine.

FIG. 4 shows the dehumidification system with the primary heat exchanger PHX and the 3-wheeled machine. The compressed air is cooled in the primary heat exchanger, led into the compressor C and further compressed therein. Subsequently, the air flows through the RAM heat exchanger RAM CON, with the humidity being condensed. The condensate is separated in the downstream water separator WE. The air subsequently flows through the turbine T, in which the air is expanded and thereby cooled. The air is subsequently led into the cabin or into a mixing chamber. Furthermore a line is provided for the temperature regulation which connects the compressor C on the inlet side with the outlet side of the turbine T. A temperature control valve TCV is provided therein.

The fan FAN is furthermore arranged in the stagnation air channel and is driven like the compressor C by the turbine T and forms a 3-wheeled machine with these components.

In the embodiment in accordance with FIG. 4, the stagnation air or ambient air first flows through the RAM heat exchanger RAM CON and subsequently through the serially arranged primary heat exchanger PHX.

The advantages of a dehumidification system in accordance with the invention consist in particular of the fact that a component, namely the condenser CON is omitted with the indirect utilisation of the turbine discharge air. In comparison with the direct utilisation of the turbine discharge air, a further advantage can be set forth in that a further turbine stage is omitted. Both have the advantage of a reduced system construction volume, a reduced weight, increased reliability and improved system process efficiency with simultaneously lower costs. Furthermore, the existing icing problems at the condenser with known systems is eliminated.

Typical demands on a dehumidification system in accordance with FIGS. 3 and 4 are, for example, an air conditioner discharge humidity of 7 g/kg at an ambient humidity of 19 g/kg and 38° C. ambient air temperature. This degree of dehumidification is achieved at a pressure level of 5.5 bar and 35° C. at the discharge of the RAM heat exchanger RAM CON and at a degree of water separation of 96% and RAM CON efficiency of 96%. However, other combinations of pressure/temperature efficiency are possible to achieve the required degree of dehumidification such as at 6 bar and 37° C. at a 97% degree of separation.

Figure 5:
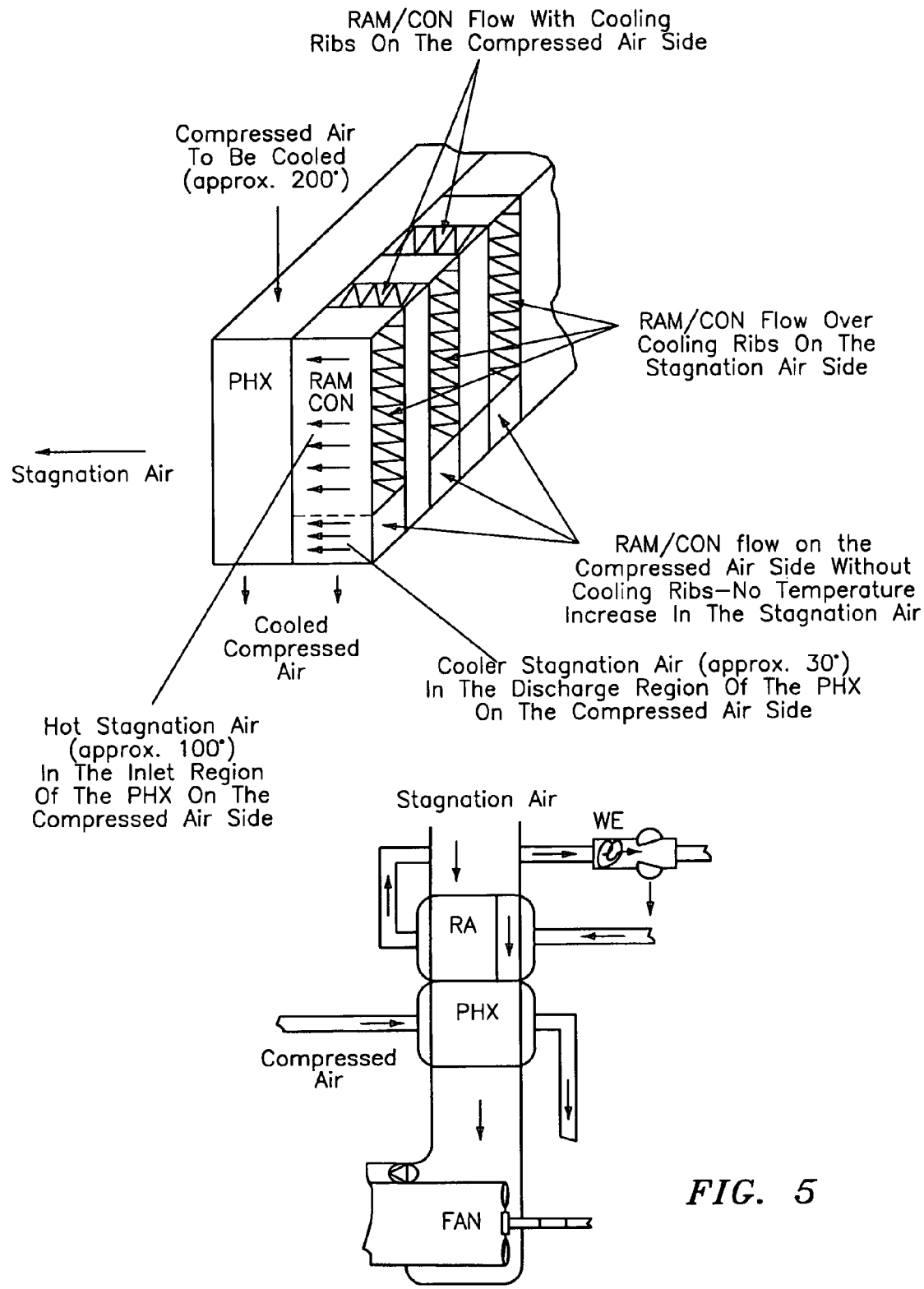
FIG. 5: an embodiment of the RAM heat exchanger with a partly serial, partly parallel PHX arrangement on the stagnation air side.

The discharge temperature of the RAM heat exchanger RAM CON at the compressed air side can be further lowered in that the inlet temperature of the RAM heat exchanger RAM CON on the compressed air side is reduced. This can be achieved in that the efficiency of the primary heat exchanger PHX disposed upstream on the compressed air side is increased. In accordance with FIG. 5, this increase in efficiency of the PHX is achieved in that the PHX is not arranged fully serially on the stagnation air side (see FIG. 4), but partly serially and partly parallel to the RAM heat exchanger RAM CON, as is shown in FIG. 5. For the degree of heat transmission, it is substantially the stagnation air temperature in the discharge region of a heat exchanger on the compressed air side which is decisive. It is therefore important that this region is acted upon on the stagnation air side with air which is as cool as possible. In the embodiment in accordance with FIG. 5, this is achieved for the primary heat exchanger PHX in that the RAM heat exchanger RAM CON on the stagnation air side has no cooling fins in the discharge region on the compressed air side, as is shown at the top in FIG. 5. In comparison with a purely serial arrangement in accordance with FIG. 4, the primary heat exchanger PHX thereby receives much cooler stagnation air of e.g. 30° C. instead of approximately 100° C. in the discharge region on the compressed air side, with a bypass of the RAM heat exchanger RAM CON on the stagnation air side of approximately 10% being sufficient to lower the "normal" PHX discharge temperature at the compressed air side from e.g. 110° C. to approximately 85° C. It follows from this that the increase in the heat transmission in the PHX heat exchanger is much larger than the reduction in the heat transmission in the RAM heat exchanger RAM CON (due to the 10% smaller RAM CON stagnation air amount). Depending on the actual demands, this "bypass" of the RAM heat exchanger RAM CON by means of design can also be selected to be larger or smaller than 10% of the total stagnation air amount.

The bottom of FIG. 5 shows the schematic representation of the heat exchanger version with a partly serial and partly parallel arrangement of the PHX heat exchanger on the stagnation air side relative to the RAM heat exchanger RA.

FIG. 6 shows the RAM heat exchanger RAM CON in different embodiments. The RAM heat exchanger RAM CON can be designed as a double parallel cross flower with secondary cooling air, with this, for example, being cabin air. FIGS. 6a, b shows such an embodiment. Here, the RAM heat exchanger RAM CON is partly acted upon by cabin air and partly by ambient or stagnation cooling air. A second heat exchanger can be disposed downstream on the outlet side of the RAM heat exchanger on the compressed air side, with this second heat exchanger being cooled, for example, by cabin air of 27° C. This second heat exchanger can also be integrated in the RAM heat exchanger RAM CON. Alternatively to this, only the region of the compressed air outlet side of the RAM heat exchanger on the stagnation air side can also be additionally cooled by cabin air.

Figure 6A:
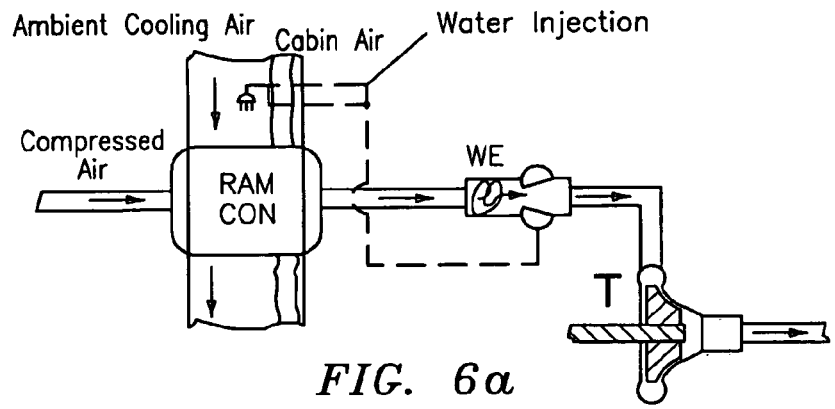
FIG. 6: different embodiments of the RAM heat exchanger.
Figure 6B:
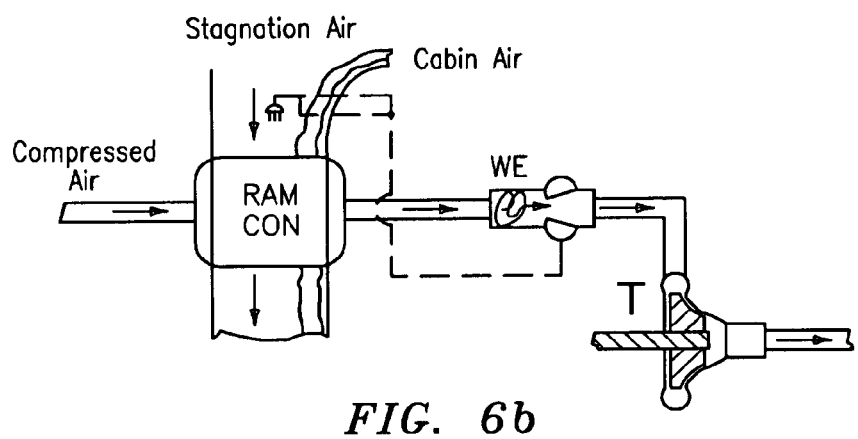
Figure 6C:
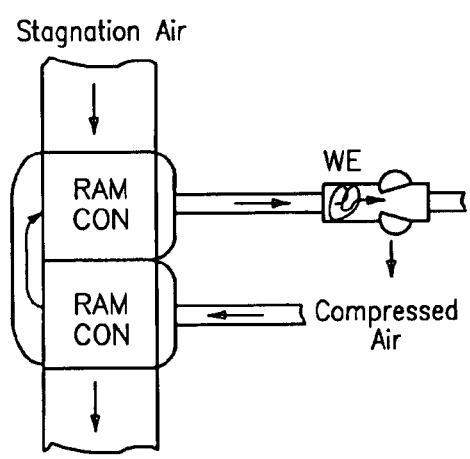
Figure 6D:
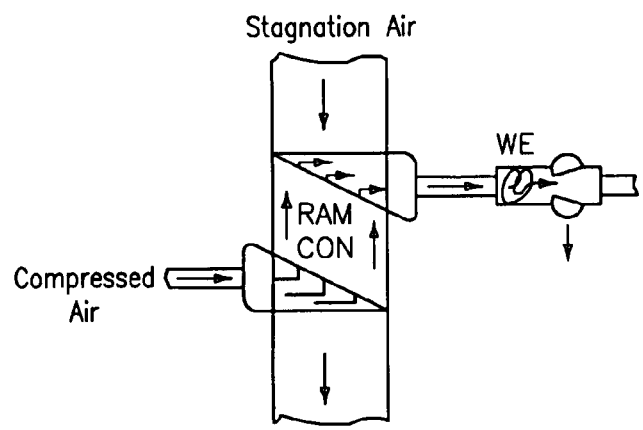

The efficiency of the heat exchanger RAM CON can also be increased, in that this is made as a double cross flower (FIG. 6c) or as a cross counter flower (FIG. 6d). In the embodiment in accordance with FIG. 6c, the compressed air is crossed twice with the stagnation air flow; in the embodiment in accordance with FIG. 6d, the compressed air is partly led in the counter flow to the stagnation air.

It is generally advantageous not to fully separate the feed of stagnation air and cabin air in the RAM heat exchanger. This has the advantage that in the flight phase, in which unlike the operation on the ground or at low flight altitudes no dehumidification is necessary, since the ambient humidity is low, the whole cross section on the stagnation air side can be used for the RAM heat exchanger for the stagnation air. In this case, the part of the RAM heat exchanger acted upon by the cabin air on the ground or at low flight altitudes is acted upon by stagnation air.

As can be seen from FIGS. 6a, b, water originating from the water separator WE is sprayed into the stagnation air or ambient air flow and into the cabin air flow. The evaporation enthalpy of the water sprayed in is thus additionally used for cooling purposes. Provision can also be made to add water in addition to the water arising in the water separator WE.

FIG. 7 shows a dehumidification system with a reheater in different embodiments. If a turbine disposed downstream of the dehumidification process expands the air to below 0° C., a reheater is preferably disposed downstream of the dehumidification process. The water proportion remaining after the water separator is evaporated therein and the icing of the turbine thus prevented. The reheater can be supplied with hot air in various manners. In accordance with FIG. 7a, the reheater R is in communication with the outlet side of the compressor C so that some of the compressed air is not led into the RAM heat exchanger RAM, but into the reheater R. This is in communication with the inlet side of the compressor C on the outlet side.

Figure 7A:
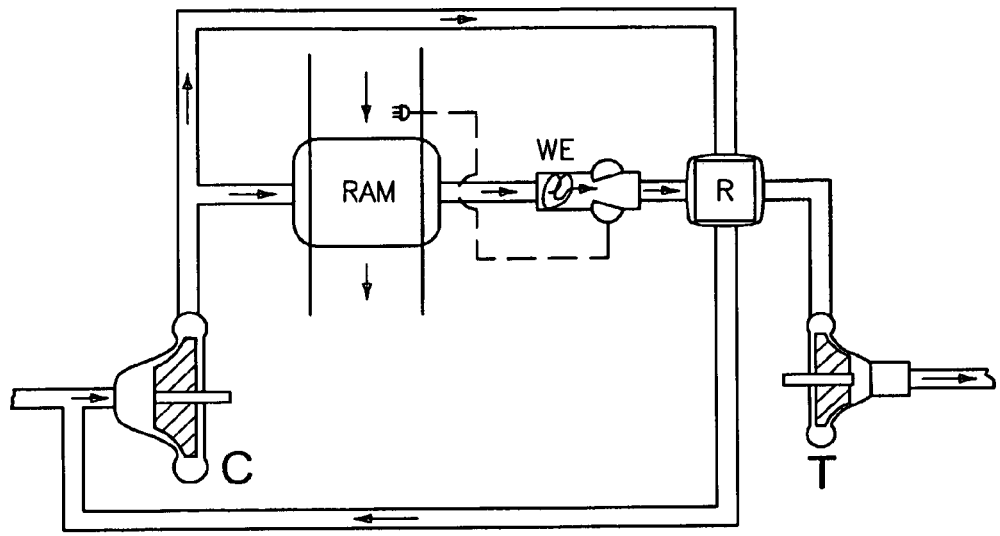
FIG. 7: different embodiments of the reheater warm air supply.
Figure 7B:
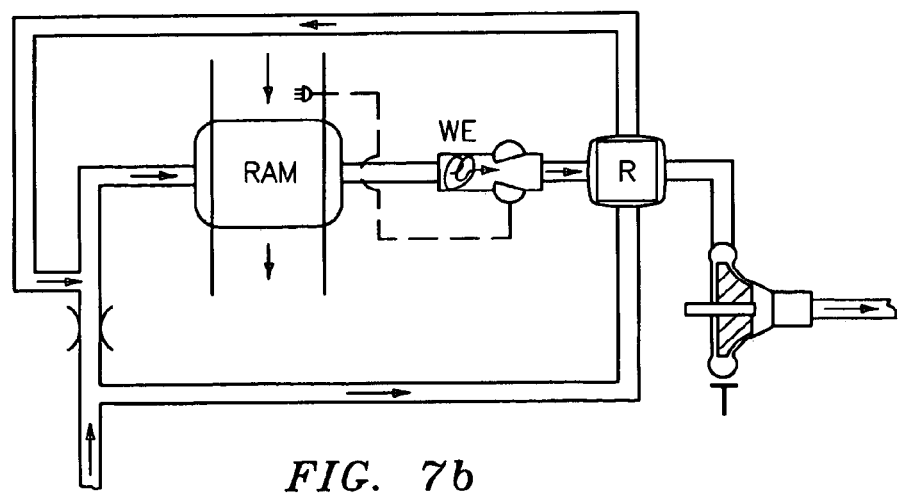

FIG. 7b shows an embodiment in which a restrictor is disposed upstream of the RAM heat exchanger RAM. The inlet side of the restrictor is in communication with the inlet side of the reheater R. Its outlet side is in communication with the outlet side of the restrictor so that the pressure drop over the restrictor is used to lead a part flow over the reheater R.

Figure 7C:
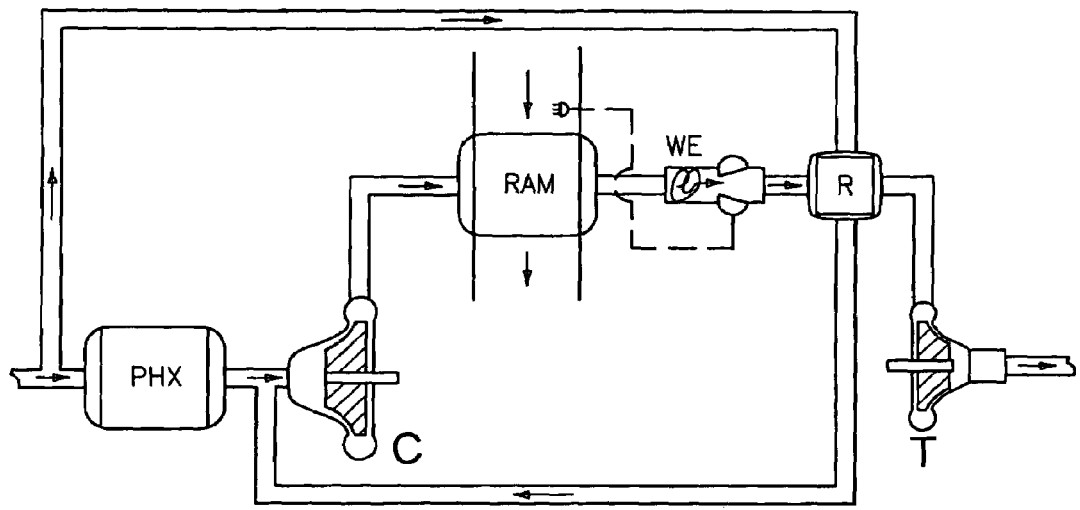

FIG. 7c shows an embodiment in which the reheater R is in communication with the inlet side of a primary heat exchanger PHX on the inlet side. The outlet side of the reheater R is in communication with the inlet side of the compressor C disposed downstream of the primary heat exchanger PHX.

Figure 7D:
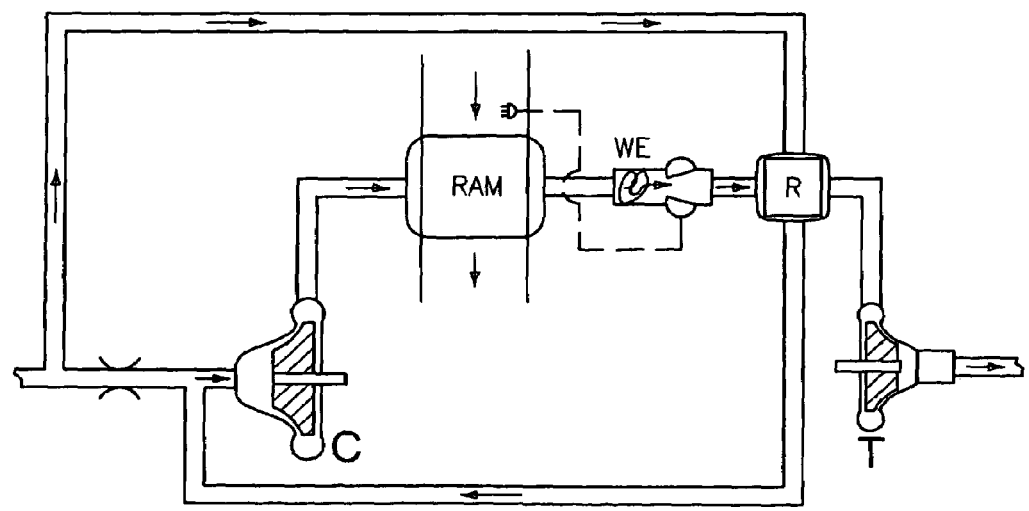

FIG. 7d shows an embodiment in which a restrictor is disposed upstream of the compressor C. On the inlet side, the reheater R is in communication with the inlet side of the restrictor and on the outlet side with the outlet side of the restrictor or with the inlet side of the compressor C.

Figure 7E:
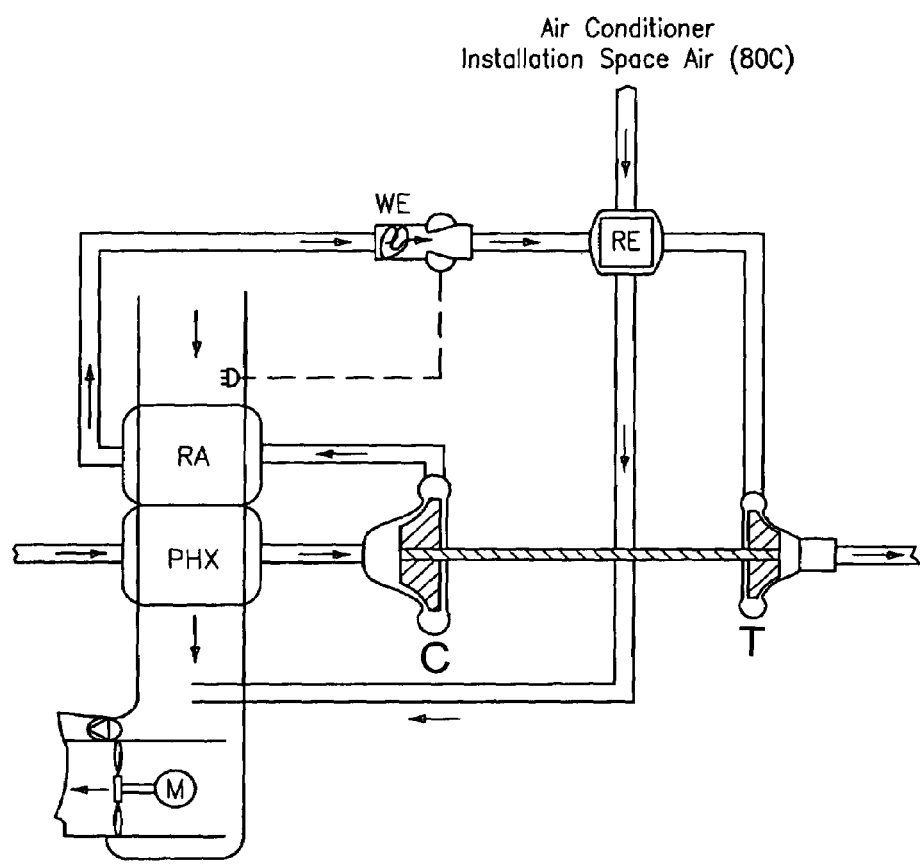

In a further embodiment in accordance with FIG. 7e, the reheater RE is in communication with the installation space of the air conditioner. The air drawn out of this has a temperature of e.g. 80° C. The air is cooled in the reheater RE and subsequently led into the stagnation air channel. The fan driven by the motor M is located herein.

The increase in efficiency of the system process through the omission of the condenser CON allows a higher energy expenditure in the expansion unit (turbine) which can be used for a higher compression in the compressor connected to the turbine. The higher pressure level at the compressor discharge and in the RAM heat exchanger resulting from this improves the condensate formation and reduces the flow pressure losses.

Figure 8:
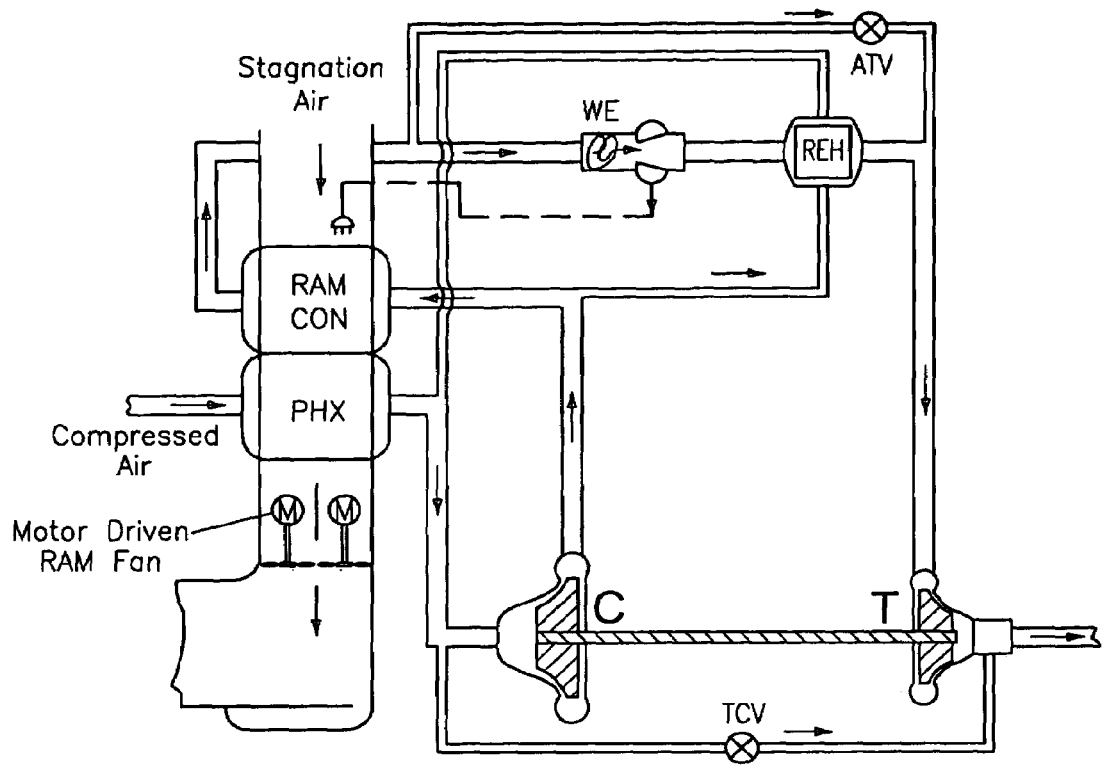
FIG. 8: a dehumidification system with motor-driven RAM fans and a bypass with valve ATV.

The pressure level in the RAM heat exchanger RAM CON can be further increased in that a RAM fan connected to the turbine and to the compressor is decoupled and then e.g. electrically driven. Such an embodiment is shown, for example, in FIG. 7e and in FIG. 8. The whole turbine capacity is thereby available to the compressor, whereby a further increase in the compressing capacity results. FIG. 8 shows a dehumidification system in which two motor driven RAM fans are provided in the stagnation air passage. The compressor C and the turbine T are decoupled from the fans.

FIG. 8 further shows the bypass with bypass valve ATV. At higher flight altitudes, a dehumidification of the air is not necessary due to the low ambient humidity. For these conditions, the efficiency of the system process can be further increased by the bypass. In the embodiment in accordance with FIG. 8, the bypass bypasses the water separator WE and the reheater REH. The bypass is in communication with the outlet side of the RAM heat exchanger RAM CON and with the inlet side of the turbine T. The water separator WE and a reheater REH are bypassed by opening the bypass valve ATV, whereby the pressure losses of these components are removed, i.e. the transmission and performance of the system is increased. Furthermore, FIG. 8 shows the temperature control valve TCV which can be opened as required to control the temperature at the turbine discharge. It is arranged in a bypass which extends from the inlet side of the compressor C to the outlet side of the turbine T.

Figure 9:
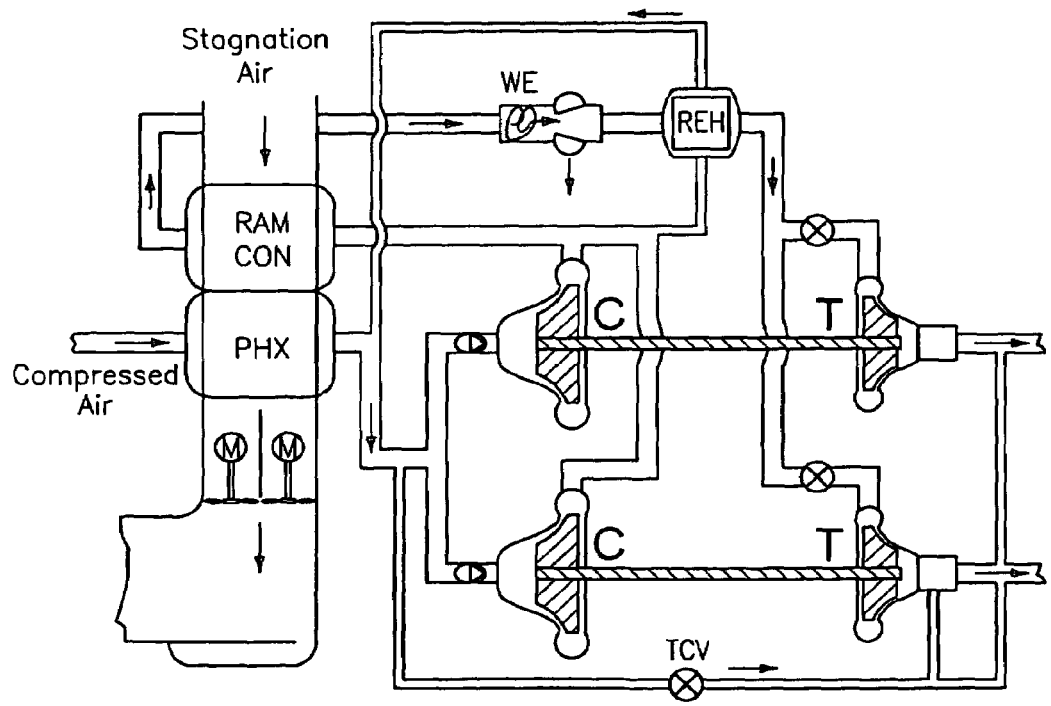
FIG. 9: a dehumidification system with two 2-wheeled machines with the turbines of an upstream common dehumidification unit.

FIG. 9 shows an embodiment in which the dehumidification system in accordance with the invention is used for two two-wheeled machines. After passing through the primary heat exchanger PHX, the compressed air flows through two compressors C switched in parallel and is further compressed therein. The air now flows partly through the reheater REH and the larger part into the RAM heat exchanger RAM CON in which the condensation takes place. The water is separated in the downstream water separator WE. A remaining water portion is evaporated in the reheater REH. The compressed air subsequently flows through the two turbines T switched in parallel which form two-wheeled machines with the respective compressors C. Furthermore, a bypass line with the temperature control valve TCV is provided by means of which the temperature at the turbine discharge can be controlled.

The invention claimed is:

1. A system for dehumidification in air conditioners, comprising
    an expansion stage,
    a condenser, and
    a water separator upstream of the expansion stage, wherein
    the condenser is formed by a heat exchanger (RAM CON) cooled by ambient air or stagnation air or another fluid, with the exception of process air, to which the compressed air to be dehumidified is supplied,
    the heat exchanger is a RAM heat exchanger, and
    (i) the RAM heat exchanger (RAM CON) is divided into two and the heat exchanger region facing the outlet side on the compressed air side is acted upon by air or another fluid whose temperature is under the ambient air temperature or stagnation air temperature, or
    (ii) a bypass which can be closed by a valve (ATV) and which bypasses the water separator (WE) is provided which is in communication with the inlet of the expansion unit.

2. A system for dehumidification in air conditioners, comprising
    an expansion stage,
    a condenser, and
    a water separator disposed upstream of the expansion stage, wherein
    the condenser is formed by a heat exchanger (RAM CON) cooled by ambient air or stagnation air or another fluid, with the exception of process air, to which the compressed air to be dehumidified is supplied,
    the heat exchanger is a RAM heat exchanger,
    a primary heat exchanger (PHX) is disposed upstream of the RAM heat exchanger (RAM CON) on the compressed air side,
    the RAM heat exchanger (RAM CON) and the primary heat exchanger (PHX) are arranged in the stagnation air channel such that the primary heat exchanger (PHX) partly serial or partly parallel to the RAM heat exchanger (RAM CON) is acted upon by ambient air or stagnation air, and
    the RAM heat exchanger (RAM CON) has no cooling fins on the stagnation air side in the discharge region on the compressed air side.

3. A system for dehumidification in air conditioners, comprising
    an expansion stage,
    a condenser, and
    a water separator disposed upstream of the expansion stage, wherein
    the condenser is formed by a heat exchanger (RAM CON) cooled by ambient air or stagnation air or another fluid, with the exception of process air, to which the compressed air to be dehumidified is supplied,
    the heat exchanger is a RAM heat exchanger, and
    (i) means are provided through which the cabin air can be fed to the RAM heat exchanger (RAM CON) as cooling air, and the mixing in of the cabin air on the stagnation air side takes place in the discharge region of the RAM heat exchanger (RAM CON) on the compressed air side, or
    (ii) an expansion turbine is provided for the expansion of cabin vitiated air, means are provided through which the expanded cabin air can be fed to the RAM heat exchanger (RAM CON) as cooling air, and the RAM heat exchanger (RAM CON) is divided into two and the heat exchanger region facing the outlet side on the compressed air side is acted upon by the expanded air.

4. A system for dehumidification in air conditioners, comprising
    an expansion stage,
    a condenser, and
    a water separator disposed upstream of the expansion stage, wherein
    the condenser is formed by a heat exchanger (RAM CON) cooled by ambient air or stagnation air or another fluid, with the exception of process air, to which the compressed air to be dehumidified is supplied,
    the heat exchanger is a RAM heat exchanger, a reheater (REH, R, RE) is provided which is disposed upstream of the expansion stage and acted upon by warm air to evaporate residual water in the air fed to the expansion stage, and one of the following (i)–(vi):
- (i) the reheater (REH, R) is in communication on its hot air side with the compressed air inlet of the RAM heat exchanger (RAM CON, RAM) on the inlet side and with the inlet of a compressor (C) disposed on the compressed air side upstream of the RAM heat exchanger (RAM CON, RAM) on the outlet side,
- (ii) the reheater (REH, R) is in communication on its hot air side with the inlet side of a restrictor disposed upstream of the compressed air inlet of the RAM heat exchanger (RAM CON, RAM) on the inlet side and with the inlet of the heat exchanger (RAM CON, RAM) on the outlet side,
- (iii) the reheater (REH) is in communication on its hot air side with the inlet of a heat exchanger (PHX), which is disposed upstream of a compressor (C) disposed upstream of the RAM heat exchanger (RAM CON, RAM) on the inlet side and with the inlet of the compressor (C) on the outlet side,
- (iv) the reheater (REH, R) is in communication on its hot air side with the inlet of a restrictor disposed upstream of a compressor (C) on the inlet side and with the inlet of the compressor (C) on the outlet side,
- (v) the reheater (REH) is in communication on its hot air side with the installation space of the air conditioner on the inlet side and with the discharge of the RAM heat exchanger (RAM CON, RAM) on the stagnation air side or of another heat exchanger on the outlet side,
- (vi) the bypass with a valve (ATV) bypasses the water separator (WE) and the reheater (REH).

5. A system in accordance with claim 1, wherein a compressor stage is provided which is disposed upstream of the RAM heat exchanger (RAM CON) on the compressed air side.

6. A system in accordance with claim 2, wherein a compressor stage is provided which is disposed upstream of the RAM heat exchanger (RAM CON) on the compressed air side.

7. A system in accordance with claim 3, wherein a compressor stage is provided which is disposed upstream of the RAM heat exchanger (RAM CON) on the compressed air side.

8. A system in accordance with claim 1, wherein the compressed air is made available by a compressor stage which is acted upon by pre-compressed air or by ambient air or stagnation air or by cabin air and compresses this air.

9. A system in accordance with claim 2, wherein the compressed air is made available by a compressor stage which is acted upon by pre-compressed air or by ambient air or stagnation air or by cabin air and compresses this air.

10. A system in accordance with claim 3, wherein the compressed air is made available by a compressor stage which is acted upon by pre-compressed air or by ambient air or stagnation air or by cabin air and compresses this air.

11. A system in accordance with claim 4, wherein the compressed air is made available by a compressor stage which is acted upon by pre-compressed air or by ambient air or stagnation air or by cabin air and compresses this air.

12. A system in accordance with claim 1, wherein the RAM heat exchanger (RAM CON) and the primary heat exchanger (PHX) are arranged in the stagnation air channel such that the primary heat exchanger (PHX) serial or parallel to the RAM heat exchanger (RAM CON) is acted upon by ambient air or stagnation air.

13. A system in accordance with claim 3, wherein the RAM heat exchanger (RAM CON) and the primary heat exchanger (PHX) are arranged in the stagnation air channel such that the primary heat exchanger (PHX) serial or parallel to the RAM heat exchanger (RAM CON) is acted upon by ambient air or stagnation air.

14. A system in accordance with claim 4, wherein the RAM heat exchanger (RAM CON) and the primary heat exchanger (PHX) are arranged in the stagnation air channel such that the primary heat exchanger (PHX) serial or parallel to the RAM heat exchanger (RAM CON) is acted upon by ambient air or stagnation air.

15. A system in accordance with claim 1, wherein the RAM heat exchanger (RAM CON) is designed as a cross flower, a double cross flower, a cross counter flower and/or a double parallel cross flower.

16. A system in accordance with claim 2, wherein the RAM heat exchanger (RAM CON) is designed as a cross flower, a double cross flower, a cross counter flower and/or a double parallel cross flower.

17. A system in accordance with claim 3, wherein the RAM heat exchanger (RAM CON) is designed as a cross flower, a double cross flower, a cross counter flower and/or a double parallel cross flower.

18. A system in accordance with claim 4, wherein the RAM heat exchanger (RAM CON) is designed as a cross flower, a double cross flower, a cross counter flower and/or a double parallel cross flower.

19. A system in accordance with claim 1, wherein means are provided by which water can be sprayed into the cooling air flow of the RAM heat exchanger (RAM CON), with the water occurring in the water separator (WE) and/or made additionally available.

20. A system in accordance with claim 2, wherein means are provided by which water can be sprayed into the cooling air flow of the RAM heat exchanger (RAM CON), with the water occurring in the water separator (WE) and/or made additionally available.

21. A system in accordance with claim 3, wherein means are provided by which water can be sprayed into the cooling air flow of the RAM heat exchanger (RAM CON), with the water occurring in the water separator (WE) and/or made additionally available.

22. A system in accordance with claim 4, wherein means are provided by which water can be sprayed into the cooling air flow of the RAM heat exchanger (RAM CON), with the water occurring in the water separator (WE) and/or made additionally available.

23. A system in accordance with claim 22, wherein
the water is sprayed in on the stagnation air side in the discharge region of the RAM heat exchanger (RAM CON) on the compressed air side, or both the ambient air flow and stagnation air flow.

24. A system in accordance with claim 19, wherein
the water is sprayed in on the stagnation air side in the discharge region of the RAM heat exchanger (RAM CON) on the compressed air side, or both the ambient air flow and stagnation air flow.

25. A system in accordance with claim 20, wherein
the water is sprayed in on the stagnation air side in the discharge region of the RAM heat exchanger (RAM CON) on the compressed air side, or both the ambient air flow and stagnation air flow.

26. A system in accordance with claim 21, wherein
the water is sprayed in on the stagnation air side in the discharge region of the RAM heat exchanger (RAM CON) on the compressed air side, or both the ambient air flow and stagnation air flow.

27. A system in accordance with claim 1, wherein a fan is provided in the stagnation air channel which is either in communication with the expansion and compressor stages or not in communication with the expansion and compressor stages and equipped with its own drive.

28. A system in accordance with claim 2, wherein a fan is provided in the stagnation air channel which is either in communication with the expansion and compressor stages or not in communication with the expansion and compressor stages and equipped with its own drive.

29. A system in accordance with claim 3, wherein a fan is provided in the stagnation air channel which is either in communication with the expansion and compressor stages or not in communication with the expansion and compressor stages and equipped with its own drive.

30. A system in accordance with claim 4, wherein a fan is provided in the stagnation air channel which is either in communication with the expansion and compressor stages or not in communication with the expansion and compressor stages and equipped with its own drive.

31. A system in accordance with claim 30, wherein the fan is not in communication with the expansion and compressor stages and driven by a separate motor (M) and/or a turbine.

32. A system in accordance with claim 27, wherein the fan is not in communication with the expansion and compressor stages and driven by a separate motor (M) and/or a turbine.

33. A system in accordance with claim 28, wherein the fan is not in communication with the expansion and compressor stages and driven by a separate motor (M) and/or a turbine.

34. A system in accordance with claim 29, wherein the fan is not in communication with the expansion and compressor stages and driven by a separate motor (M) and/or a turbine.

35. A system in accordance with claim 1, wherein two or more expansion stages switched in parallel or serially are disposed downstream of the water separator (WE).

36. A system in accordance with claim 2, wherein two or more expansion stages switched in parallel or serially are disposed downstream of the water separator (WE).

37. A system in accordance with claim 3, wherein two or more expansion stages switched in parallel or serially are disposed downstream of the water separator (WE).

38. A system in accordance with claim 4, wherein two or more expansion stages switched in parallel or serially are disposed downstream of the water separator (WE).

39. A system in accordance with claim 1, wherein
a fan is driven by a separator motor (M) and/or a turbine and connected on the drive side by a shaft to an additional compressor disposed upstream of the RAM heat exchanger (RAM CON), or
the water separator (WE) is integrated in the discharge of the RAM heat exchanger (RAM CON) on the compressed air side such that both components form a unit, or
the water separator (WE) is disposed downstream of the RAM heat exchanger (RAM CON) of the compressed air side and forms a separate component.

40. A system in accordance with claim 2, wherein
a fan is driven by a separator motor (M) and/or a turbine and connected on the drive side by a shaft to an additional compressor disposed upstream of the RAM heat exchanger (RAM CON), or
the water separator (WE) is integrated in the discharge of the RAM heat exchanger (RAM CON) on the compressed air side such that both components form a unit, or
the water separator (WE) is disposed downstream of the RAM heat exchanger (RAM CON) of the compressed air side and forms a separate component.

41. A system in accordance with claim 3, wherein
a fan is driven by a separator motor (M) and/or a turbine and connected on the drive side by a shaft to an additional compressor disposed upstream of the RAM heat exchanger (RAM CON), or
the water separator (WE) is integrated in the discharge of the RAM heat exchanger (RAM CON) on the compressed air side such that both components form a unit, or
the water separator (WE) is disposed downstream of the RAM heat exchanger (RAM CON) of the compressed air side and forms a separate component.

42. A system in accordance with claim 4, wherein
a fan is driven by a separator motor (M) and/or a turbine and connected on the drive side by a shaft to an additional compressor disposed upstream of the RAM heat exchanger (RAM CON), or
the water separator (WE) is integrated in the discharge of the RAM heat exchanger (RAM CON) on the compressed air side such that both components form a unit, or
the water separator (WE) is disposed downstream of the RAM heat exchanger (RAM CON) of the compressed air side and forms a separate component.

43. A system in accordance with claim 4, wherein the bypass with the valve (ATV) bypasses the water separator (WE) and reheater (REH) and connects the discharge of the RAM heat exchanger (RAM CON) on the compressed air side with the inlet of the expansion unit.

* * * * *